(12) United States Patent
Haken

(10) Patent No.: US 7,124,374 B1
(45) Date of Patent: Oct. 17, 2006

(54) GRAPHICAL INTERFACE CONTROL SYSTEM

(76) Inventor: Carl Herman Haken, 5 Old Neversink Rd., Danbury, CT (US) 06811

( * ) Notice: Subject to any disclaimer, the term of this patent is extended or adjusted under 35 U.S.C. 154(b) by 751 days.

(21) Appl. No.: 09/519,242

(22) Filed: Mar. 6, 2000

(51) Int. Cl.
*G06F 3/038* (2006.01)
(52) U.S. Cl. .................. 715/859; 715/761; 715/856
(58) Field of Classification Search ............... 345/4, 345/1.1–1.2, 717–718, 754, 761, 764, 856–864
See application file for complete search history.

(56) References Cited

U.S. PATENT DOCUMENTS

| 5,047,754 A * | 9/1991 | Akatsuka et al. ........... 340/709 |
| 6,219,027 B1 * | 4/2001 | Shimizu et al. ............. 345/145 |
| 6,388,658 B1 * | 5/2002 | Ahern et al. ................ 345/168 |

* cited by examiner

*Primary Examiner*—Ba Huynh

(57) ABSTRACT

A graphical user interface for a computer system with attached processor devices transfers input control for a pointing device on a principal computer display to native display devices and interfaces on attached devices whenever the system senses that a display cursor has moved to the edge of a display in the direction of the attached device.

14 Claims, 2 Drawing Sheets

GRAPHICAL INTERFACE CONTROL SYSTEM

BACKGROUND OF THE INVENTION

The invention relates to a graphical user interface for use in a computer or data processing system which includes a principal display and one or more attached devices with secondary displays which are movable with respect to the first display. More specifically the invention relates to a graphical interface which permits a user to seamlessly control information display on multiple display devices with a single pointing device.

DESCRIPTION OF THE PRIOR ART

At the present time most desktop and laptop computer systems make use of a graphical user interface wherein images on a display screen represent data and program icons on a virtual desktop. The user selects and controls the programs and data by use of a pointing device, typically a mouse, trackball or touchscreen, which is programmed to move a cursor on the screen. The system differentiates between various input commands and takes actions using program logic which combines information derived from the pushing of keyboard and mouse buttons with information which reflects the position of the cursor on the display screen.

Personal data assistant devices (PDA's) generally also use some form of graphical user interface. More sophisticated devices, for example those using the Microsoft Windows CE operating system have interfaces and pointing devices which closely resemble those on laptop computers. Less sophisticated PDA's, handheld video games and cellular telephones more typically accept inputs from a more simple set of directional keys and may display user information in the form of highlighted menu entries or simple lighted indicators or buttons.

Hardware and software is now readily available which allows devices in these and other categories (for example digital cameras, audio players etc.) to be docked or otherwise attached and/or interconnected to a computer system. The interconnected systems are, however, usually complicated and difficult for a user to control. It is not uncommon for a principal computer system to seize control of the inputs of a docked device, whereby the keyboard and pointing device of the computer remotely control the docked device, but this usually is done in a manner which significantly changes the graphical interface on the docked device, and can be confusing for the user. The situation can become even more complicated when multiple devices are docked to a system at the same time and the user is required to sort-out the differences between the methods and interfaces used to control them.

SUMMARY OF THE INVENTION

A graphical user interface for a computer system allows a user to select and control attached devices based upon the physical location of those devices relative to a principal display screen. The system determines the relative direction from the principal display screen toward each attached device and a graphical user interface allows the user to assume control of each such device by using a principal pointing device to move a cursor to the edge of the display screen in the direction of the device. As the cursor moves to the edge of the principal display screen it seamlessly assumes control of the native display and graphical interface on the docked device. The user is thus able to interpret information from the docked device using a familiar interface and does not suffer from confusion about which device he is operating

DESCRIPTION OF THE DRAWING

The invention is described with reference to the drawings in which.

A PREFERRED EMBODIMENT

Figure 1:
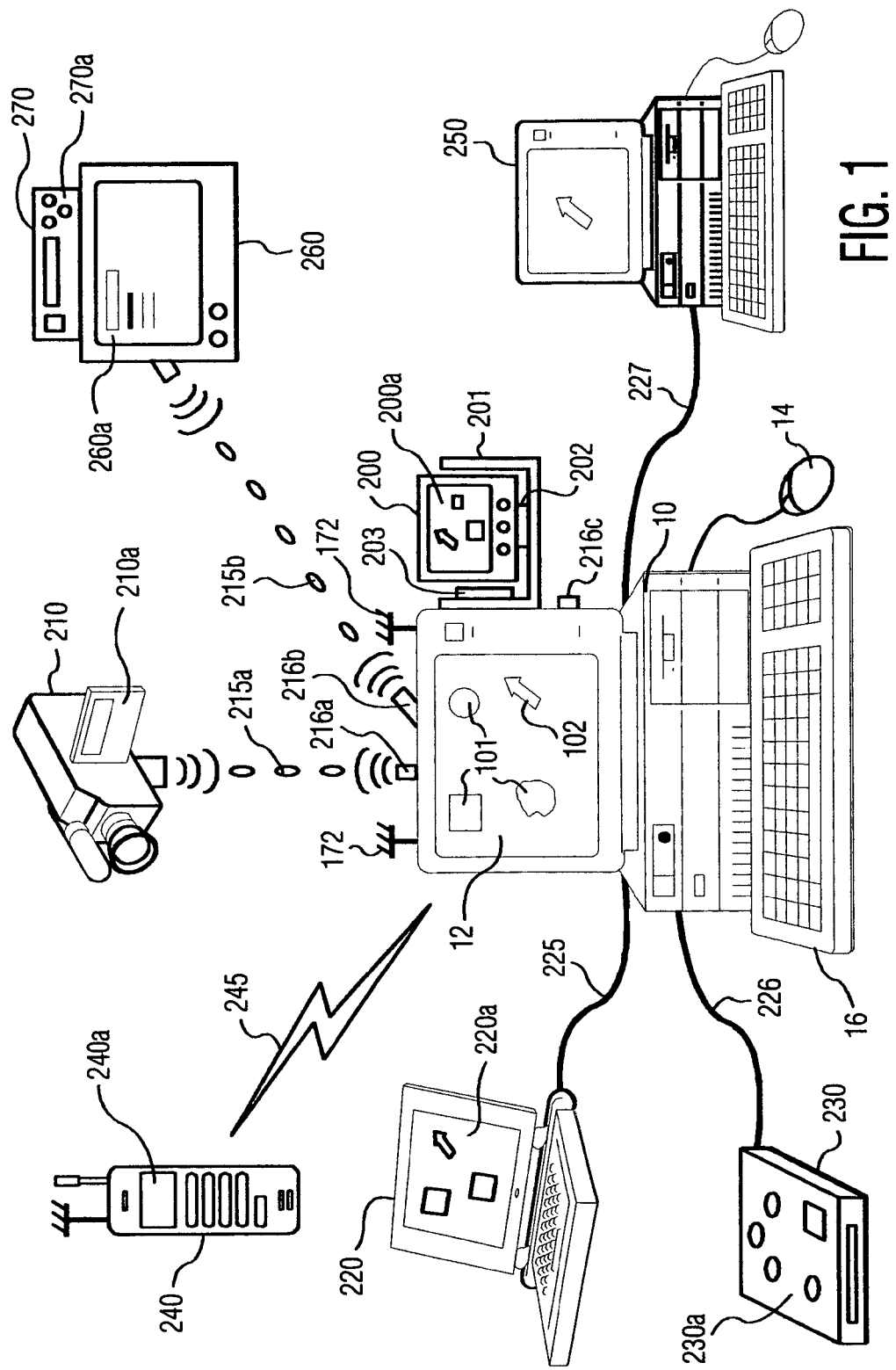
FIG. 1 schematically shows a computer system in accordance with the invention.

A system according to the invention comprises a desktop personal computer processor 10 which is connected in a conventional manner with a CRT display screen 12, a mouse pointing device 14, and a keyboard 16. In this embodiment the computer 10 is preferably programmed with the Microsoft Windows 98 operating system and is mainly controlled via a graphical user interface (GUI) which is displayed as the well known virtual desktop with program and data icons 101 and a cursor arrow 102. The cursor arrow moves on the screen 12 up, down, right and left in response to the user's movement of the mouse 14 on a table top.

The system also comprises a number of separate processor devices which are removably interconnected with the computer 10 and which, by way of example, include a docked PDA 200, a digital camera 210, a laptop computer 220, a scanner 230, a cellular or cordless telephone 240 a second desktop computer and display 250, a television receiver 260 and a VCR 270. The manner in which each of these devices is connected to the computer 10 is relatively unimportant and by way of illustration may include: a docking cradle 201 which supports the PDA on the right side of the cabinet of CRT display 12 and which couples to the PDA to the processor 10 via a multipin connector 202; a USB or other network bus connection 225, 226, 227 to the laptop computer 220, the scanner 230 and the second desktop computer 250; infrared links 215a and 215b to the video camera 210, television receiver 260 and VCR 270 and a wireless radio link 245 to the cellular telephone 240. Each separate processor device includes its own visual display device. Again by way of example the laptop computer 220 and the PDA 200 respectively each include an LCD display screen (220a, 200a) and operate under control of sophisticated operating systems which support full virtual desktop displays with icons and cursors. In contrast the video camera 210 and cellular telephone 240 may comprise less sophisticated LCD screens (210a, 240a) which permit simple menu or icon selection via highlighting, but without full cursor display and control. The television receiver may have a relatively simple on-screen display 260a while the VCR 270 may have indicator lights 270a together with a numerical channel or time indicator 270b and the scanner 230 may simply have a display panel 230a with an array of indicator lights. Each of the separate processor devices will include its own native user interface software, as conventionally used in that category of appliance.

Sensors and other means are provided so that the computer 10 can be aware of the relative direction from the CRT display screen 12 to each of the separate processor devices. In the case of the PDA 200, the cradle 201 is shown permanently affixed to the right side of the screen and the direction from the screen to the PDA will thus be known to be to the right whenever the electrical interface though connector 202 is completed. Alternately, a switch 203 or a noncontacting sensor may be used to sense when the PDA is present in the docking cradle. The directions from the display screen to the video camera 210 and to the television receiver/VCR (260/270) can be determined using an array of directional infrared sensors 216a, 216b and 216c and the direction to the cellular telephone can be determined by using a directional antenna array 172 in the wireless interface. In general, the direction from the CRT display to the larger hardwired devices, for example to the computers 220, 250 and scanner 230 will most easily be entered manually into the interface software data by the user when these devices are first connected or later moved.

Figure 2:
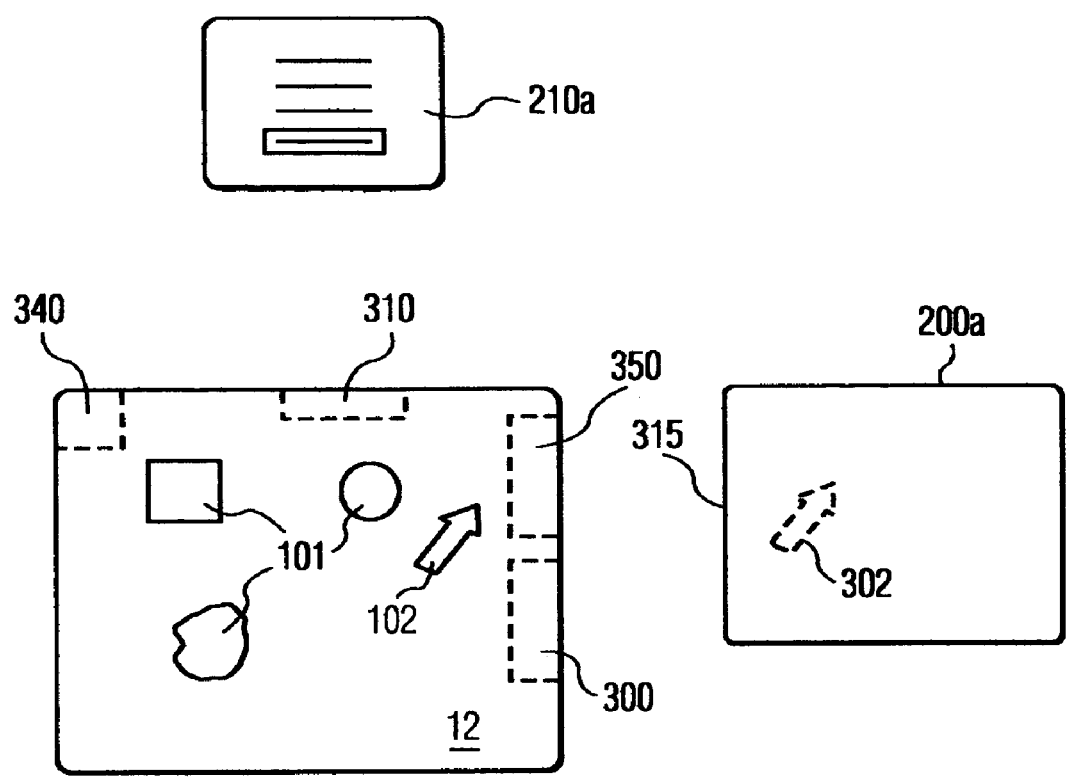
FIG. 2 schematically shows details of some displays on the screens of the principal CRT and a docked PDA.

During operation, the user selects to control a particular separate processor device by using the mouse pointer 14 to move the cursor 102 to an edge of the display screen 12 in the relative direction of the selected device. Thus in the illustrations of FIGS. 1 and 2, moving the cursor to the top edge 310 of the screen 12 will select control of the video camera 210, moving the cursor to the right center edge 300 of the screen will select control of the PDA 200, moving the cursor to the top left corner edge 340 will select the cellular telephone 240 etc. If two or more devices lie in the same general direction from the display screen, as in the case of PDA 200 and the second computer 250, then separate portions of the relevant screen edge can be assigned to select each device in a manner which suggests their relative position to the user. For example, the portion of the right screen edge 300 which is used to select the PDA 200 can be chosen below the edge portion 350 which is used to select the second computer 250 in order to give an impression that the second computer 250 is more distant from the screen 12 than is the PDA 200. In practice programmers skilled in the art will recognize that the cursor need only be moved into a hot zone near the edge of the screen to trigger the software to cause it to transfer control.

As the cursor 102 is moved to an edge to the screen, interface software in the computer 10 checks to determine whether a controllable separate processor device lies in the indicated direction and, if so, transfers the input signal from the mouse 16 to the pointer input of the GUI software in that device. By way of example, in the Figures, moving the cursor to the top of the screen 310 will, seamlessly transfer the output of the mouse to the video camera's native interface and cause a highlighted entry to move to the bottom of a menu list on the camera LCD screen 210a. Further movement of the mouse in same direction will then cause the highlighting to move up the menu list on the camera LCD screen. Similarly moving the cursor to the lower right edge 300 of the CRT screen 12 will transfer the mouse input to the native interface of the PDA and enable the user to move the cursor on the PDA screen. If the display on the selected separate processor device is a simple array of indicator lights, for example as illustrated on scanner 230, then movement of the mouse 14 may simply cause each light on the device to illuminate in sequence in response to the mouse movement. Similarly, if the display on the separate processor device is a numerical display, then the native GUI software may use movement of the mouse as a signal to increment or decrement the indicated function and numerical display reading.

Depending on the characteristics of the native interfaces (for example in the laptop computer 220 or the PDA 200) in each device, it may also be appropriate to seamlessly transfer input signals from the computer keyboard 16 to a keyboard input for the separate processor the device.

It is preferred to blank-out the cursor 102 on the CRT display 12 whenever control is transferred to a separate processor device, which will give the impression that the cursor has actually moved across to the connected device. When possible, the cursor on the display of the connected device can have the same size and/or shape as the cursor on the screen 12 in order to further enhance the impression that a single cursor has actually moved across. Thus, as control is transferred to the PDA 200, a matching cursor 302 can be generated on the left edge 315 of the PDA screen 200a, directly opposite the point on the edge 300 of CRT screen 12 where the cursor 102 was last seen. It is also preferred to place a warning icon at the appropriate edge of the display screen 12 to indicate that inputs are being directed to a remote device. The cursor display can also be animated to create a cartoon impression of movement while transfer of control is being effected.

Control inputs to the remote device can generally be discontinued whenever the cursor or other indication on the remote devices display moves to an edge adjacent the computer display 12, for example whenever the cursor 302 on the PDA display 200a moves back to its left edge 315. However, in some cases, depending on the nature of the display and native graphical interface in the separate processor device, it may be necessary for the user to input a specific escape code via the mouse buttons or keyboard 16 to effect a return to the interface operating system in the computer 10. The techniques mentioned above can also be used to give the impression that a cursor is actually traveling back from the separate processor display to the CRT screen.

It may be desirable to disable local controls of the connected processors whenever the pointing device 14 and/or keyboard 16 assume control thereof. Thus when control of the second desktop computer 250 is taken up by mouse 16, its own native keyboard and mouse will be rendered inoperative by the system software.

The invention claimed is:

1. A system for processing and displaying data comprising:
   a first processor which functions to generate a first image of a first graphical desktop user interface;
   a first display screen disposed at a first screen location and connected to the first processor to display the first image;
   a first pointing device connected to the first processor to control movement of a first cursor in the first image;
   second processor means which include second visual display means and which are disposed at a second display location which is movable in relation to the first screen location of the first display screen;
   means for communicating signals between the first processor and the second processor means;
   means which determine a first relative direction, from the first screen location of the first display screen to the second display location of the second visual display means; and
   program means which expand the display of the graphical desktop user interface onto the second visual display means at times when first processor is communicating with the second processor means and the second visual display means are also in the vicinity of the first display screen so that movement of the first pointing device in the first relative direction causes the first cursor to move to and to disappear at an edge of first display screen and further causes the appearance of a new visual indication on the second visual display means.

2. The system of claim 1 wherein the second visual display means comprise a second display screen and wherein the program means function so that movement of the first pointing device in the first relative direction causes the first cursor to move to and disappear off an edge of the first display screen in a direction toward the second visual display means and to apparently seamlessly appear as a new cursor on the second display screen.

3. The system of claim 2 wherein the program means function so that the new cursor appears at an edge of the second display screen which is oriented toward the first display screen.

4. The system of claim 2 wherein the first pointing device further functions to control movement of the new cursor on the second display screen.

5. The system of claim 2 wherein the program means function to cause the first cursor to reappear on the first display screen whenever the new cursor is moved off the edge of the second display screen in a direction toward the first display screen.

6. The system of claim 1 wherein the first pointing device controls the appearance and apparent movement of the new visual indication on the second visual display means.

7. The system of claim 1 wherein the means for communicating is a docking cradle attached at an edge of the first display screen for supporting the second processor means.

8. The system of claim 7 wherein the means which determine comprise means which sense that the second processor means are in the cradle.

9. The system of claim 1 wherein the means for communicating are a wireless interface and wherein the means which determine comprise a directional antenna array.

10. The system of claim 1 wherein the means which communicate are an infrared light interface and the means which determine are directional infrared sensors.

11. The system of claim 1 wherein the second visual display means comprise one or more indicator lights.

12. The system of claim 1, wherein the second processor means is a device selected from the group consisting of: personal data assistants, laptop computers, digital cameras, audio players, video games, cordless telephones, cellular telephones, television receivers, VCR's and scanners.

13. A method for processing and displaying data comprising:
   generating a first graphical desktop user interface image on a first display screen which is disposed at a first screen location with a first processor;
   using a first pointing device to control movement of a cursor on the first interface image;
   communicating signals between the first processor and second processor means, which second processor means are disposed at a second display location which is movable in relation to the first screen location of the first display screen and which include second visual display means;
   determining a first relative direction from the first screen location of the first display screen to the second display location of the visual display means; and
   expanding the display of graphical desktop user interface onto the visual display means at times when first processor is communicating with the second processor means and the second processor means are also in the vicinity the display screen so that movement of the first pointing device in the first direction causes the cursor to move to and to disappear off of an edge of first display screen and further causes the appearance of a new visual indication on the second visual display means.

14. A system for processing and displaying data comprising:
   a first processor which functions to generate an first image of a desktop graphical user interface;
   a first display screen disposed at a first screen location and connected to the first processor to display the first image;
   a first pointing device connected to the first processor to control movement of a cursor in the first image;
   second processor means which include second visual display means and which are disposed at a second display location which is movable in relation to the first display screen;
   means for communicating signals between the first processor and the second processor means;
   means which determine a first relative direction from the first screen location of the first display screen to the second display location of the second visual display means; and
   program means operating within at least the first processor to allow selection or movement of an indication on the second visual display means in response to operation of the first pointing device at times when first processor is communicating with the second processor means and the second processor means are also in the vicinity the first display screen so that operation of the first pointing device in the first direction causes the cursor to move to and to disappear off of an edge of first display screen together with a corresponding visual indication on the second visual display means.

* * * * *